US012296764B2

(12) United States Patent
Komori et al.

(10) Patent No.: US 12,296,764 B2
(45) Date of Patent: May 13, 2025

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirokazu Komori, Mie (JP); Makoto Higashikozono, Mie (JP); Koji Yamaguchi, Mie (JP)

(73) Assignees: AUTONETWORKS TECHNOLOGIES, LTD., Mie (JP); SUMITOMO WIRING SYTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 269 days.

(21) Appl. No.: 17/924,840

(22) PCT Filed: May 7, 2021

(86) PCT No.: PCT/JP2021/017440

§ 371 (c)(1),
(2) Date: Apr. 3, 2023

(87) PCT Pub. No.: WO2021/241160

PCT Pub. Date: Dec. 2, 2021

(65) Prior Publication Data

US 2023/0219509 A1 Jul. 13, 2023

(30) Foreign Application Priority Data

May 28, 2020 (JP) ................................ 2020-093297

(51) Int. Cl.
*H02G 3/04* (2006.01)
*B60R 16/02* (2006.01)

(52) U.S. Cl.
CPC ....... *B60R 16/0222* (2013.01); *H02G 3/0437* (2013.01)

(58) Field of Classification Search
None
See application file for complete search history.

(56) References Cited

U.S. PATENT DOCUMENTS

| | | | | |
|---|---|---|---|---|
| 6,051,790 | A | 4/2000 | Takeuchi et al. | |
| 11,878,641 | B2 * | 1/2024 | Yamaguchi | H02G 3/0616 |
| 2002/0113460 | A1 * | 8/2002 | Murakami | B60R 16/0207 296/152 |

FOREIGN PATENT DOCUMENTS

| | | |
|---|---|---|
| JP | S62-140832 U | 9/1987 |
| JP | H04-118807 U | 10/1992 |

(Continued)

OTHER PUBLICATIONS

International Search Report issued on Jun. 29, 2021 for WO 2021/241160 A1 (6 pages).

*Primary Examiner* — Krystal Robinson
(74) *Attorney, Agent, or Firm* — Venjuris, P.C.

(57) ABSTRACT

One object is to provide a technology that can improve the attachability of a wiring module, in which both a grommet and a planar member are provided on a wiring member, to a door panel. The wiring module includes a wiring member, a planar member that holds the wiring member, and a grommet attached on the vehicle body side relative to the portion of the wiring member held by the planar member. The planar member includes a main plate portion that holds a section of the wiring member that extends along the inner plate portion of the door panel, and a planar member-side attachment portion attached to the grommet. The grommet (Continued)

includes a base portion fixed at a certain position with respect to the door panel and a grommet-side attachment portion to which the planar member-side attachment portion is attached.

12 Claims, 9 Drawing Sheets

(56) References Cited

FOREIGN PATENT DOCUMENTS

| | | | | |
|---|---|---|---|---|
| JP | H06223645 | A | * | 8/1994 |
| JP | 2000-071767 | A | | 3/2000 |
| JP | 2000-217229 | A | | 8/2000 |
| JP | 2002-027640 | A | | 1/2002 |
| JP | 2014-230323 | A | | 12/2014 |
| WO | 2019/187334 | A1 | | 10/2019 |

* cited by examiner

WIRING MODULE

CROSS REFERENCE TO RELATED APPLICATIONS

This application is a national phase of PCT application No. PCT/JP2021/017440, filed on 7 May 2021, which claims priority from Japanese patent application No. 2020-093297, filed on 28 May 2020, all of which are incorporated herein by reference.

TECHNICAL FIELD

The present disclosure relates to a wiring module.

BACKGROUND

A grommet is usually attached to a wiring member that connects a door and a vehicle body. Structures for attachment of a grommet and a door panel include a structure in which a grommet is passed through a through hole formed in a door panel, for example, as described in Patent Document 1, and a structure in which a grommet is disposed along a surface of a door panel, for example, as described in Patent Document 2. Grommets such as that described in Patent Document 2 are also called "through-less grommets" because they do not need to be passed through a through hole formed in a door panel unlike the grommet described in Patent Document 1.

The portion of the wiring member connecting the door and the vehicle body that is disposed along the door is disposed along a predetermined path according to the positions of devices and the like. In this case, Patent Document 3 discloses a technology in which the portion of the wiring member that is disposed along the door is held along a predetermined path by being held by an integrated component that extends in a planar shape along a door panel.

PRIOR ART DOCUMENT

Patent Document

Patent Document 1: JP 2000-217229 A

Patent Document 2: JP 2002-027640 A

Patent Document 3: International Publication WO 2019/187334

SUMMARY OF THE INVENTION

Problems to be Solved

If a wiring module provided with both a grommet and a planar integrated component such as that in Patent Document 3 is attached to a door panel, they need to be separately positioned, and thus an improvement in the attachability has been desired.

Therefore, one object is to provide a technology that can improve the attachability of a wiring module, in which both a grommet and a planar member are provided on a wiring member, to a door panel.

Means to Solve the Problem

A wiring module of the present disclosure includes: a wiring member connecting a vehicle body and a door panel; a planar member that holds a portion of the wiring member extending along an inner plate portion of the door panel; and a grommet attached on the vehicle body side relative to the portion of the wiring member held by the planar member, in which the planar member includes a main plate portion that holds a section of the wiring member that extends along the inner plate portion of the door panel, and a planar member-side attachment portion that is provided on a portion of a peripheral edge of the main plate portion and is attached to the grommet, and the grommet includes a base portion fixed at a certain position with respect to the door panel and a grommet-side attachment portion that is continuous with the base portion and to which the planar member-side attachment portion is attached.

Effect of the Invention

According to the present disclosure, it is possible to achieve an improvement in the attachability of the wiring module, in which both the grommet and the planar member are provided on the wiring member, to the door panel.

DETAILED DESCRIPTION TO EXECUTE THE INVENTION

Description of Embodiments of Present Disclosure

Figure 1:
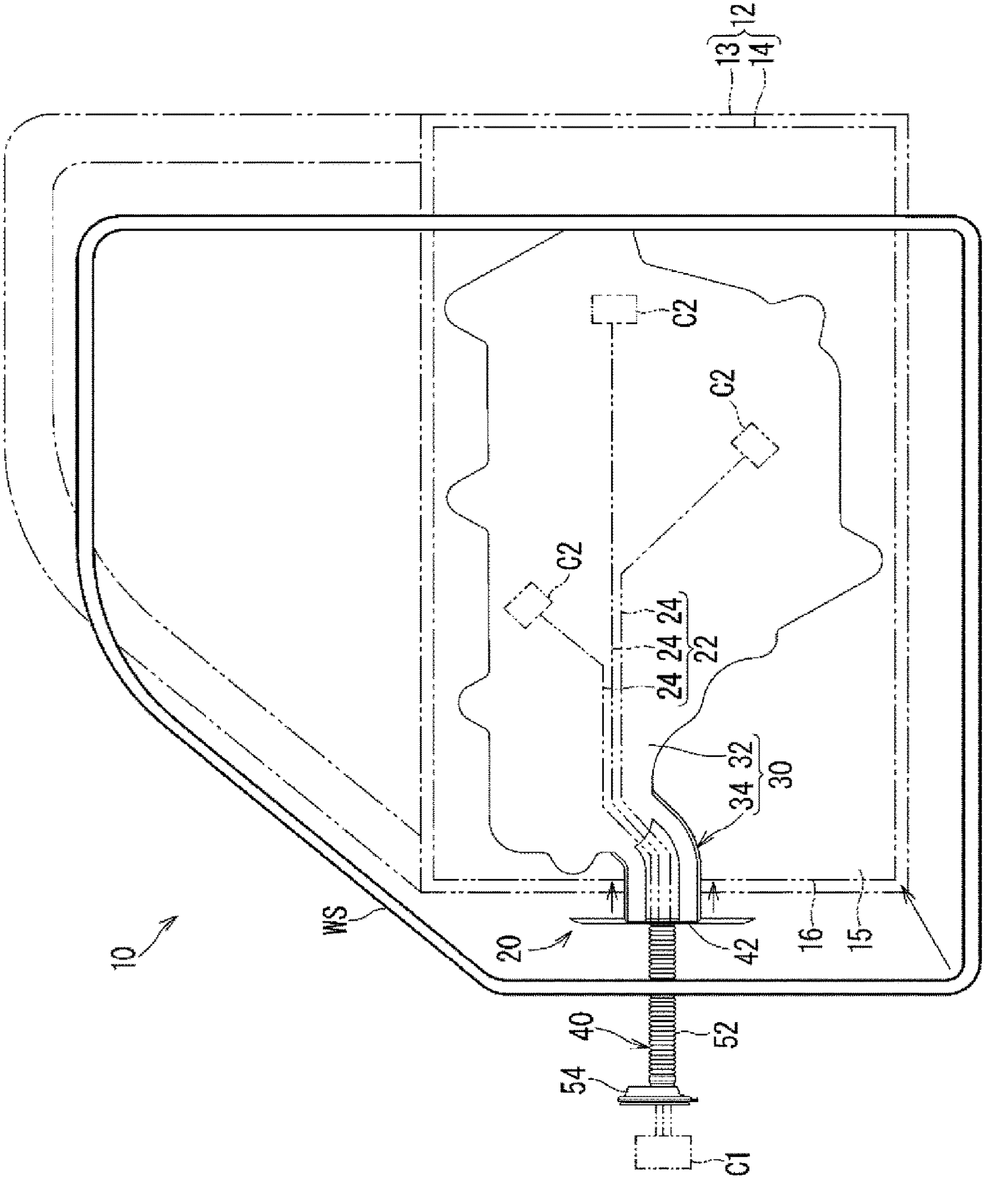
FIG. 1 is a schematic plan view showing a wiring module according to Embodiment 1 and a door panel to which it is attached.

First, embodiments of the present disclosure will be listed and described.

The wiring module of the present disclosure is as follows.

(1) A wiring module including: a wiring member connecting a vehicle body and a door panel; a planar member that holds a portion of the wiring member extending along an inner plate portion of the door panel; and a grommet attached on the vehicle body side relative to the portion of the wiring member held by the planar member, in which the planar member includes a main plate portion that holds a section of the wiring member that extends along the inner plate portion of the door panel, and a planar member-side attachment portion that is provided on a portion of a peripheral edge of the main plate portion and is attached to the grommet, and the grommet includes a base portion fixed at a certain position with respect to the door panel and a grommet-side attachment portion that is continuous with the base portion and to which the planar member-side attachment portion is attached. When one of the planar member and the grommet is positioned on the door panel by attaching the planar member and the grommet, the other can also be positioned on the door panel. In this way, it is possible to achieve an improvement in the attachability of the wiring module, in which both the grommet and the planar member are provided on the wiring member, to the door panel.

(2) In the wiring module of (1), the grommet may be attached to a surface of the door panel, and the base portion may be fixed to a surface of a side plate portion of the door panel. As a result, the grommet is a through-less grommet, and therefore the wiring member can be easily attached to the door panel.

(3) In the wiring module of (2), the main plate portion and the planar member-side attachment portion may be attached to the surface of the door panel. As a result, in addition to the grommet, the planar member is also a member that is attached to the surface of the door panel, and thereby, when attaching the wiring module to the door panel, the attachment can be performed without passing the wiring member through the door panel.

(4) In the wiring module of (3), the planar member-side attachment portion may extend from the inner plate portion to the side plate portion of the door panel, and the grommet-side attachment portion may be provided on a surface of the base portion that faces the side plate portion. As a result, the portion of the wiring member that extends between the inner plate portion and the side plate portion is guided by the planar member-side attachment portion.

(5) In the wiring module of (4), a weather strip may traverse a surface of the base portion in a vehicle, and the planar member-side attachment portion may extend to a portion of the base portion that overlaps with the weather strip. As a result, the planar member-side attachment portion can support the portion of the base portion that overlaps with the weather strip. The compression of the weather strip WS is stabilized in a door-closed state (6) In the wiring module of (4) or (5), an insertion portion through which the wiring member is passed may be formed in the planar member-side attachment portion, and on a main plate portion side with respect to the insertion portion, the planar member-side attachment portion is adjacent to the wiring member and is located on the door panel side relative to the wiring member, and on a vehicle body side with respect to the insertion portion, the wiring member is adjacent to the planar member-side attachment portion and is located on the door panel side relative to the planar member-side attachment portion. As a result, the order in which the wiring member and the planar member-side attachment portion are arranged with respect to the door panel changes before and after passing through the insertion portion.

(7) In the wiring module of any one of (2) to (6), a weather strip may traverse a surface of the base portion in a vehicle, a flange may be provided on a portion of a peripheral edge of the base portion that includes a portion traversed by the weather strip, and the flange may smooth a level difference between the surface of the base portion and the surface of the door panel. As a result, a gap is less likely to occur between the boundary between the door panel and the grommet and the weather strip.

(8) In the wiring module of any one of (1) to (7), the grommet-side attachment portion and the planar member-side attachment portion may be attached to each other by fitting a ridge portion formed on one of the grommet-side attachment portion and the planar member-side attachment portion into a recessed groove formed in the other. This facilitates the attachment of the grommet-side attachment portion and the planar member-side attachment portion.

(9) In the wiring module of (8), the grommet-side attachment portion and the planar member-side attachment portion may be attached to each other by fitting the ridge portion formed on the grommet-side attachment portion into the recessed groove formed in the planar member-side attachment portion. This stabilizes the attachment of the grommet-side attachment portion and the planar member-side attachment portion.

(10) In the wiring module of any one of (1) to (9), the wiring member may include a plurality of electric wires, and the plurality of electric wires may be arranged flat in a section from the base portion to the planar member. As a result, the height dimension of the wiring module from the door panel is minimized in the section from the base portion to the planar member.

DETAILS OF EMBODIMENTS OF PRESENT DISCLOSURE

Specific examples of the wiring module of the present disclosure will be described below with reference to the drawings. The present disclosure is not limited by these examples but indicated by the claims, and all changes that come within the claims and the meaning and range of equivalency of the claims are intended to be encompassed within the scope of the invention.

Embodiment 1

The following describes a wiring module according to Embodiment 1.

Door

First, a door of a vehicle will be described with reference to FIG. 1. FIG. 1 is a schematic plan view showing a wiring module 20 according to Embodiment 1 and a door panel 12 to which it is attached.

The door 10 is formed in a flat shape overall, and is a part of a vehicle that can be opened and closed to separate the inside and the outside of the vehicle. The open and closed states of the door 10 of the vehicle will be hereinafter simply referred to as the open and closed states. The door 10 is assumed to be a driver side door, a passenger side door, a rear seat door, etc. The door 10 will be hereinafter described as being a side door. The door may be a rear door or the like. The door 10 will be described as a hinged door. The door may also be a sliding door or the like. The door 10 includes a door panel 12 and a wiring module 20.

The door panel 12 includes an outer panel 13 and an inner panel 14. The outer panel 13 is provided on the portion of the door 10 that faces the outside of the vehicle and constitutes the outside appearance of the vehicle together with the body. The inner panel 14 is provided on the cabin side of the outer panel 13. The inner panel 14 includes an inner plate portion 15 and a side plate portion 16. The inner plate portion 15 is the portion that faces the cabin in the closed state. Provided between the inner plate portion 15 and the outer panel 13 is a space that can accommodate a window, electrical devices, and the like. For example, an opening is formed in the inner plate portion 15 to allow access to the space. The side plate portion 16 is a portion extending from an edge of the inner plate portion 15 towards the outer panel 13. Here, in particular, the side plate portion 16 extends from, among the edges of the inner plate portion 15, the edge located on the front side of the vehicle (the side of the hinged door where the hinge is provided). The side plate portion 16 defines a space that can accommodate a window, electrical devices, and the like.

The wiring module 20 is incorporated into the door 10. The wiring module 20 includes a wiring member 22, a planar member 30, and a grommet 40.

The wiring member 22 is a component that supplies power to devices incorporated in the door 10 and transmits signals between the devices incorporated in the door 10 and devices incorporated in the vehicle body. Here, the wiring member 22 includes a plurality of electric wires 24. The wiring member 22 may include optical fiber cables, or the like. Although the route and connection counterparts of the wiring member 22 in the vehicle are not particularly limited, for example, the routes and connection counterparts below are conceivable. That is, one end of the wiring member 22 is disposed on the vehicle body. A connector C1 is provided on the one end of the wiring member 22. This connector C1 is connected to a vehicle body side connector provided on a vehicle-side wiring member that extends from a battery, an electronic control unit, and the like. The other ends of the wiring member 22 are disposed on the door 10. The other ends of the wiring member 22 are connected to devices incorporated in the door 10. The wiring member 22 may be, for example, connected to the devices provided in the door 10 via connectors. In this case, connectors C2 may preferably be provided on the other ends of the wiring member 22.

An intermediate portion of the wiring member 22 is strung between the vehicle body and the door 10. More particularly, the wiring member 22 extends from the one end to the other ends from a through hole provided in the vehicle body and toward the side plate portion 16 of the door panel 12. Upon reaching the side plate portion 16, the wiring member 22 extends along the door panel 12 from the side plate portion 16 toward the inner plate portion 15.

The section of the wiring member 22 that reaches the side plate portion 16 from the through hole provided in the vehicle body and extends along the side plate portion 16 is covered and protected by the grommet 40. A plurality of electric wires 24 extend integrally in the portion of the wiring member 22 in which the grommet 40 is provided. The wiring member 22 is routed to the inner plate portion 15 and extends out of the grommet 40. The portion of the wiring member 22 extending out of the grommet 40 is held by the planar member 30. The plurality of electric wires 24 branch off on the inner plate portion 15 and extend to the positions of the devices to which they are connected. The planar member 30 holds the wiring member 22 in the branching paths.

The planar member 30 is provided on the cabin side of the door panel 12 in the door 10. The planar member 30 is a component that extends in a planar shape across the door panel 12. For example, the planar member 30 is disposed between the door panel 12 and the design trim on the door 10. The planar member 30 is a flat component that extends about as much as or larger than an opening formed in the inner plate portion 15, for example. The planar member 30 is attached to the door panel 12 so as to close the opening formed in the inner plate portion 15. The planar member 30 is attached to the inner panel 14, for example, by means of screwing, engagement structures, and the like. For example, if portions of the peripheral edge of the planar member 30 that overlap the inner panel 14 are fixed to the inner panel 14 by fastening screws or the like, the gap therebetween can be maximally sealed.

The grommet 40 is a so-called through-less grommet. The grommet 40 is attached to the door panel 12 so as to traverse a portion of the peripheral edge of the inner panel 14. The grommet 40 is attached to the side panel portion 16. The grommet 40 is attached on the vehicle body side relative to the portion of the wiring member 22 held by the planar member 30. The grommet 40 includes the base portion 42. The base portion 42 is attached to the side plate portion 16. The base portion 42 is fixed to the door panel 12 at a certain position. As used herein, the base portion 42 being fixed to the door panel 12 at a certain position refers to the base portion 42 being fixed to the door panel 12 at a predetermined position specified for each door panel 12. Note that the predetermined position at which the base portion 42 is fixed to the door panel 12 can be set as desired. For example, the predetermined position is the position at which the base 42 is fixed with a bolt. In the grommet 40, a protective tube portion 52 extends from the base portion 42 toward the vehicle body. A vehicle body attachment portion 54 is provided at the leading end of the protective tube portion 52. The vehicle body attachment portion 54 is fixed to the vehicle body.

Here, a portion of the planar member 30 is attached to the grommet 40. The grommet 40 is a molded article made of an elastic material such as an elastomer and is easily deformable. The planar member 30 is a molded article made of a resin or metal, and is more rigid than the grommet 40. A portion of the planar member 30 is attached to the portion of the grommet 40 that is desired to be of a certain shape, so as to suppress the deformation of that portion of the grommet 40.

In addition to the above-described devices to which the wiring member 22 is connected, for example, a weather strip WS and a design trim that are not shown in the figures are also incorporated in the door 10.

The weather strip WS is attached to the door panel 12 so as to extend along the peripheral edge thereof. For example, the weather strip WS shown in FIG. 1 is attached to the door panel 14 so as to extend along the peripheral edge thereof and surrounds the door panel 12. The weather strip WS has a portion that traverses a surface of the grommet 40. Normally, the weather strip WS is sandwiched between the vehicle body and the door panel 12 in the closed state where it is compressed or otherwise deformed. In the closed state, the grommet 40 supports the deformed portion of the weather strip WS that traverses the grommet 40.

The design trim is provided on the portion of the door 10 that faces the cabin and constitutes the interior appearance of the vehicle. For example, a door handle, operation portions for vehicle-mounted devices, and the like are attached to the design trim. The portion of the wiring member 22 that extends along the inner plate portion 15 and the planar member 30 are covered by the design trim.

Figure 2:
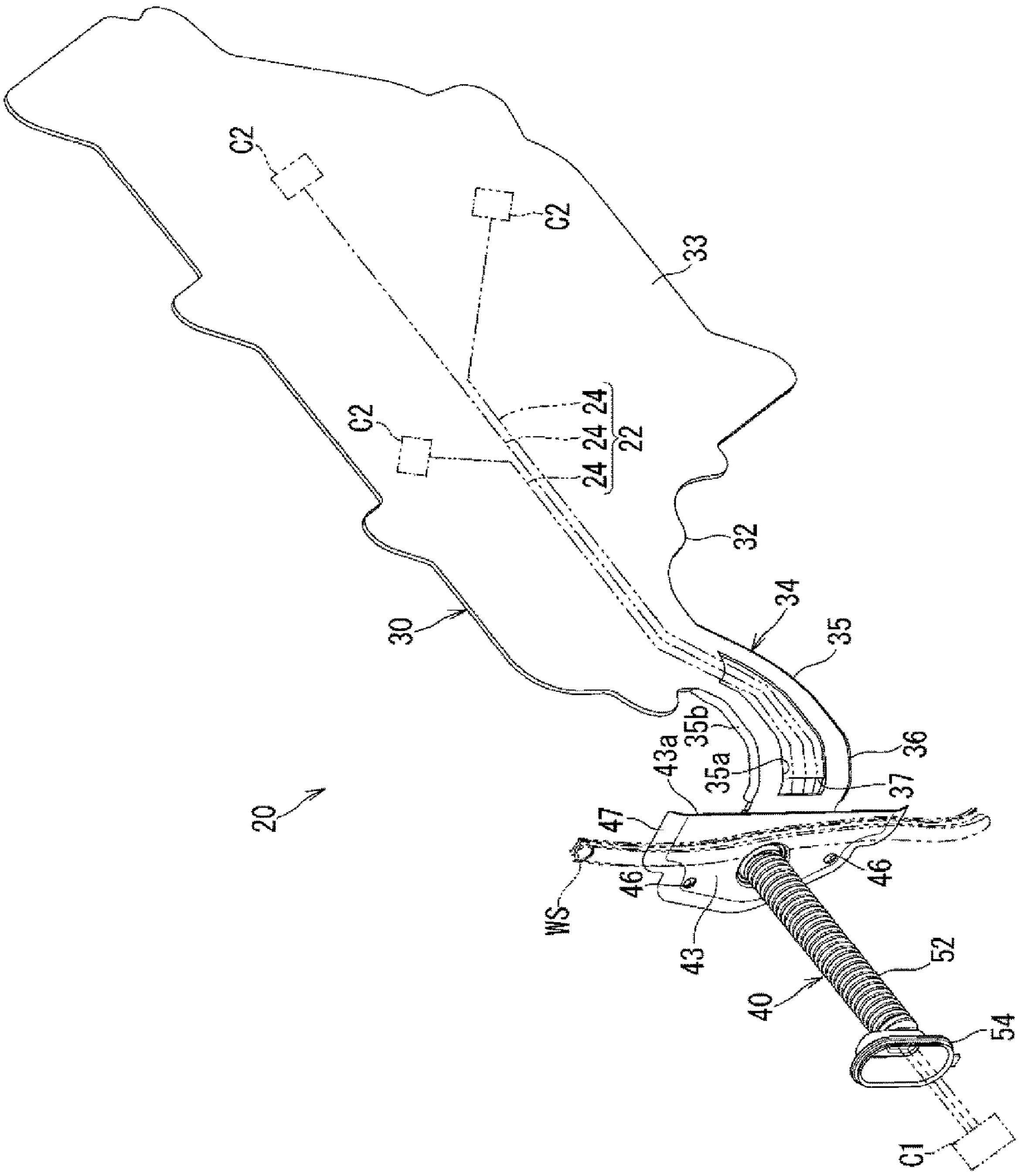
FIG. 2 is a perspective view showing the wiring module according to Embodiment 1.
Figure 3:
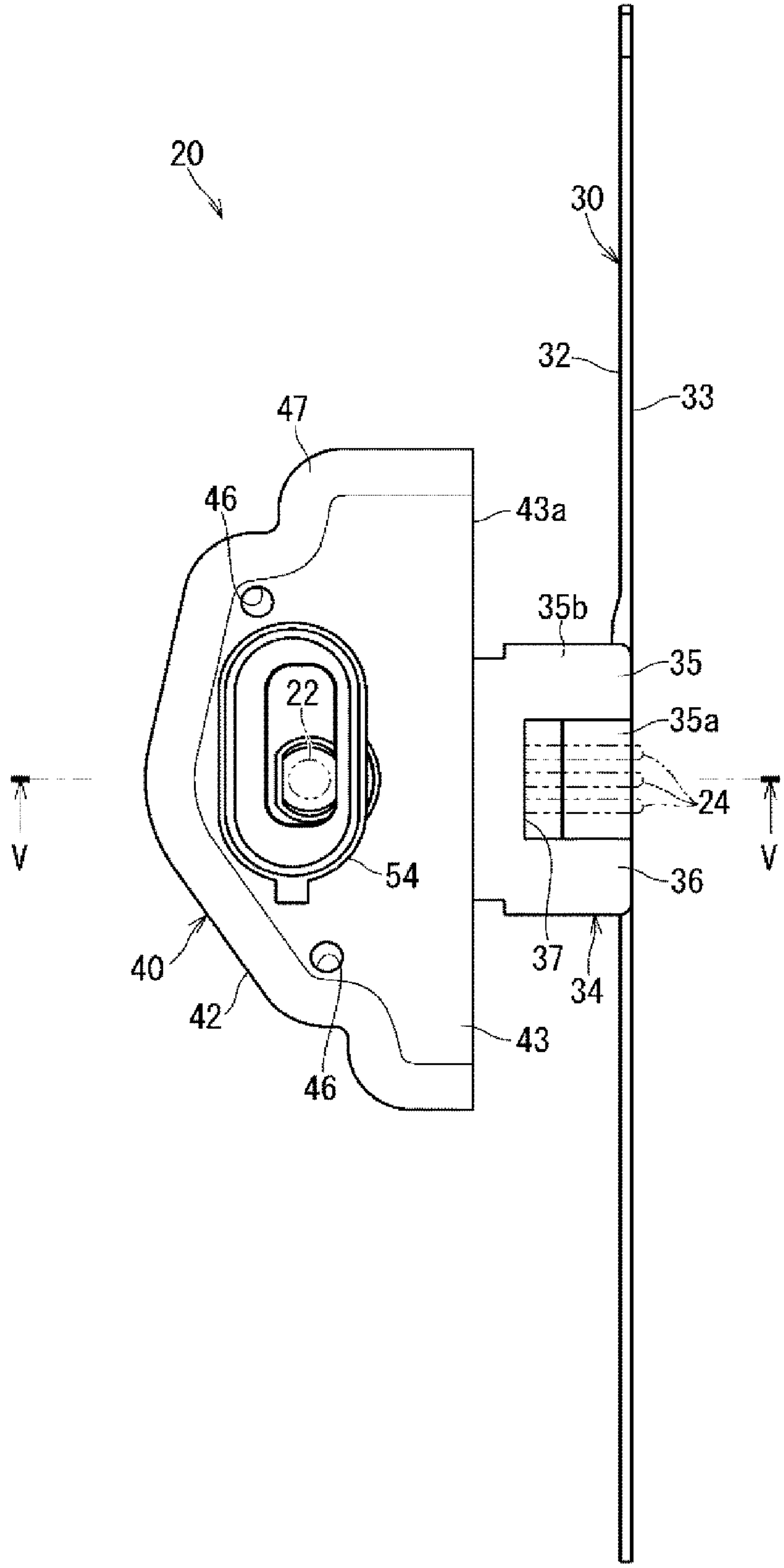
FIG. 3 is a front view showing the wiring module according to Embodiment 1.
Figure 4:
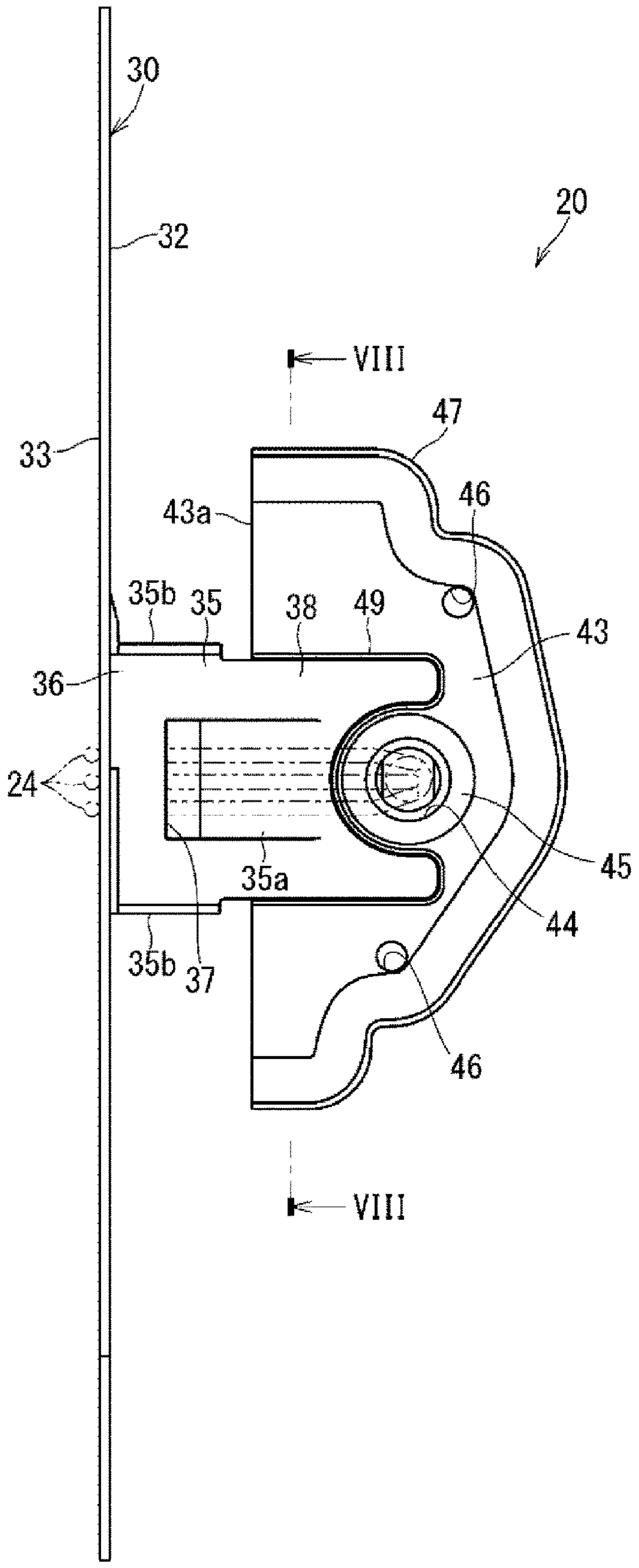
FIG. 4 is a rear view showing the wiring module according to Embodiment 1.
Figure 5:
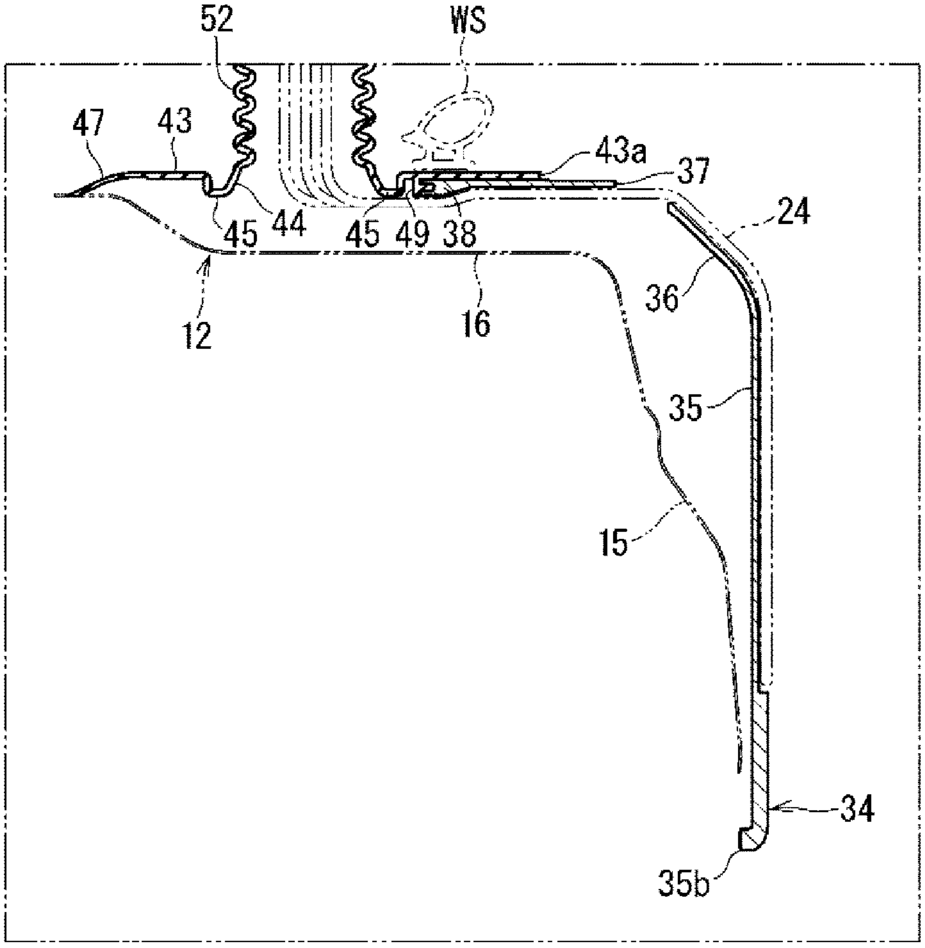
FIG. 5 is a cross-sectional view cut along line V-V of FIG. 3.

The following describes each member of the wiring module 20 in detail. First, the wiring member 22 will be described in detail with reference to FIGS. 2 to 5 in addition to FIG. 1. FIG. 2 is a perspective view showing the wiring module 20 according to Embodiment 1. FIG. 3 is a front view showing the wiring module 20 according to Embodiment 1. FIG. 4 is a rear view showing the wiring module 20 according to Embodiment 1. FIG. 5 is a cross-sectional view cut along line V-V of FIG. 3.

Wiring Member

It is assumed that the wiring member 22 has a first section, a second section, a third section, and a fourth section. The first section is the section covered by the protective tube portion 52 of the grommet 40. The second section is the section covered by the base portion 42 of the grommet 40. The third section is the section disposed on a later-described path restricting portion 35 of the planar member 30. The fourth section is the section disposed on a later-described main plate portion 32 of the planar member 30. Here, the first to fourth sections are arranged from one end on the vehicle body side to the other end on the door 10 side in the stated order. The first section is the section strung between the vehicle body and the door 10. The second section is the section mainly extending along the side plate portion 16. The third section is the section that mainly extends from the side plate portion 16 as it bends toward the inner plate portion 15. The fourth section is the section mainly extending along the inner plate portion 15.

The transverse cross-sectional shape of each section of the wiring member 22 may be formed according to the position at which it is disposed. For example, in the first section of the wiring member 22, the plurality of electric wires 24 are bundled so that the transverse cross-sectional shape is as close to a circular shape as possible. As a result, the first section of the wiring member 22, which is passed through the protective tube portion 52, can easily conform to the deformation of the protective tube portion 52. The second to fourth sections of the wiring member 22 are made flat by arranging the plurality of electric wires 24 in one direction (the vertical direction here). As a result, in the second to fourth sections of the wiring member 22, which extends along the door panel 12, the height dimension from the door panel 12 is limited. However, the transverse cross-sectional shape of the wiring member 22 in each section can be set as desired. For example, the plurality of electric wires may be arranged in a plurality of rows and columns in the second and third sections so as to make the transverse cross-sectional shape of the wiring member flatter than in the first section and have a greater height than in the fourth section.

When the transverse cross-sectional shapes of the wiring member 22 are different in adjacent sections, the transverse cross-sectional shape of the wiring member 22 changes at or near the boundaries of the adjacent sections. For example, at the boundary between the first section and the second section, the shape of the wiring member 22 is deformed from a shape in which the plurality of electric wires 24 are bundled in a circular shape to a shape in which the plurality of electric wires 24 are arranged in a row.

Figure 6:
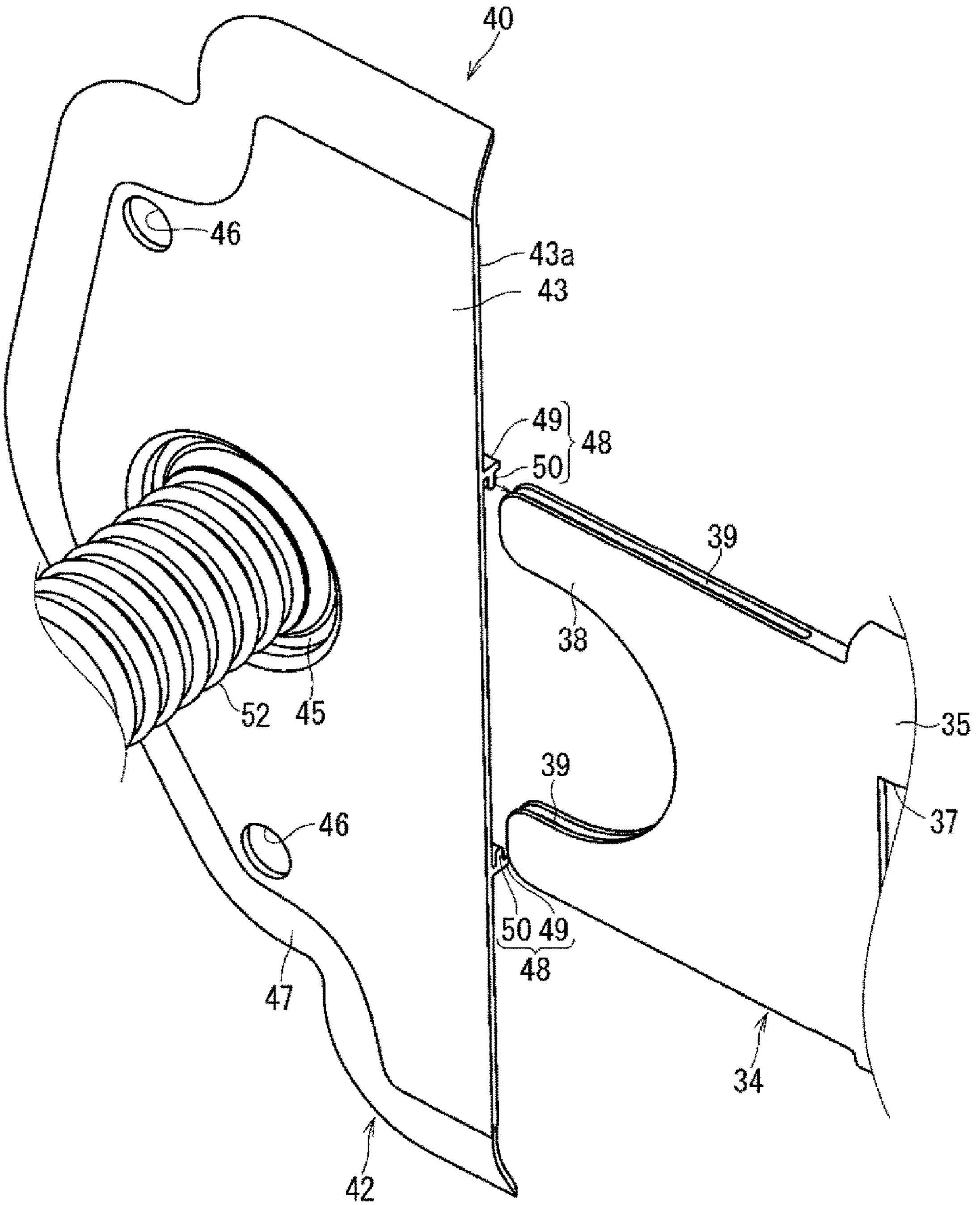
FIG. 6 is an exploded perspective view of a planar member and a grommet.
Figure 7:
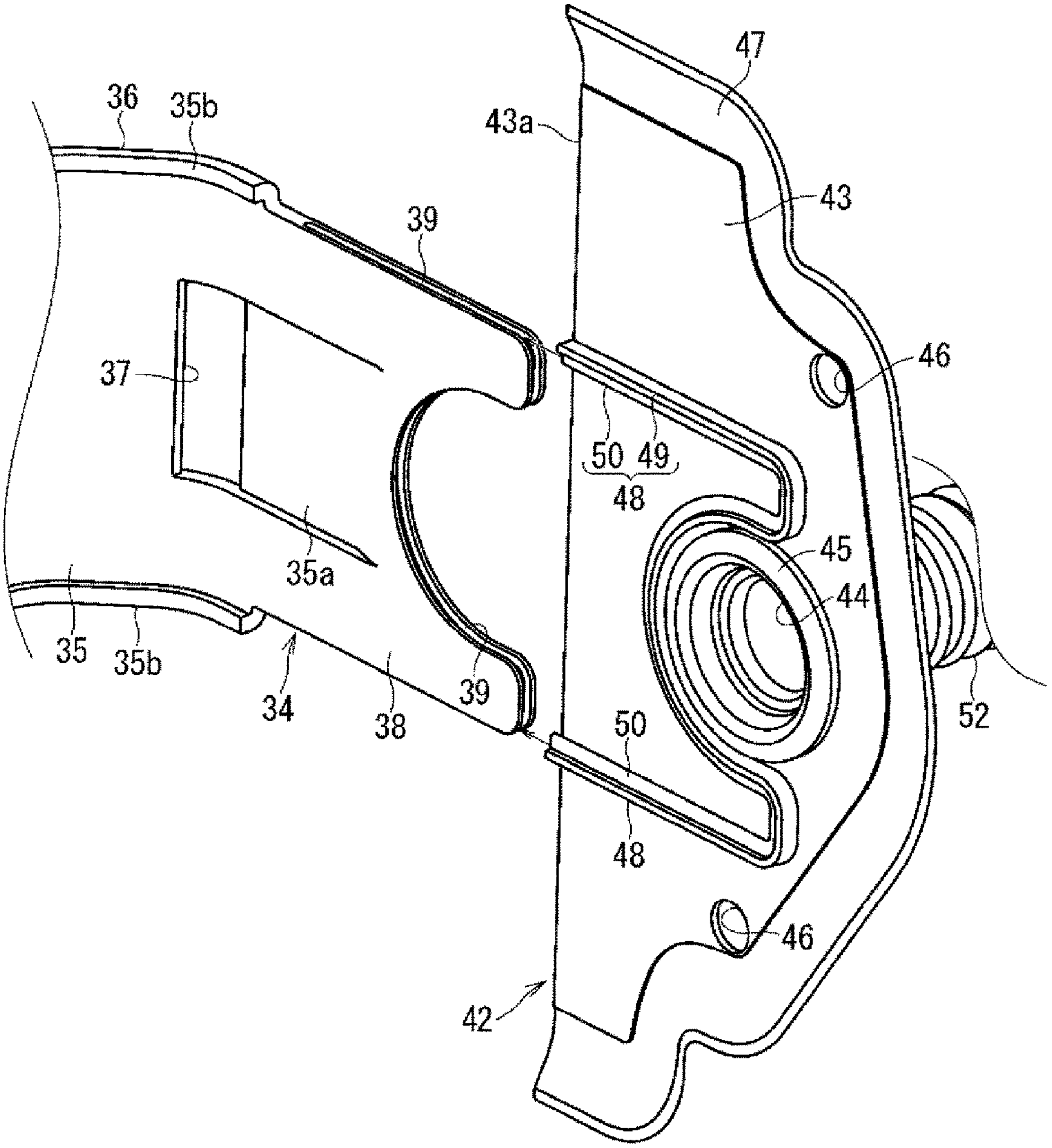
FIG. 7 is an exploded perspective view of the planar member and the grommet.
Figure 8:
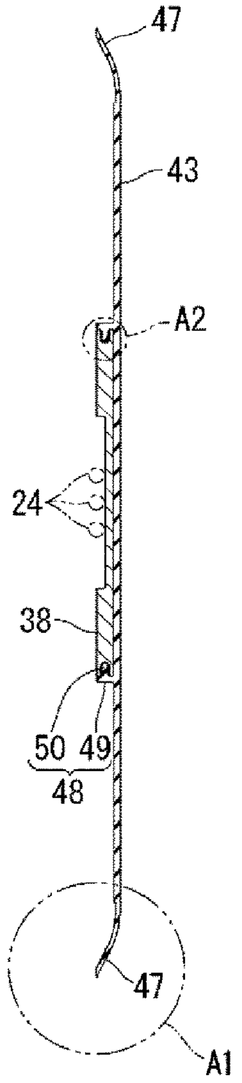
FIG. 8 is a cross-sectional view cut along line VIII-VIII of FIG. 4.
Figure 9:
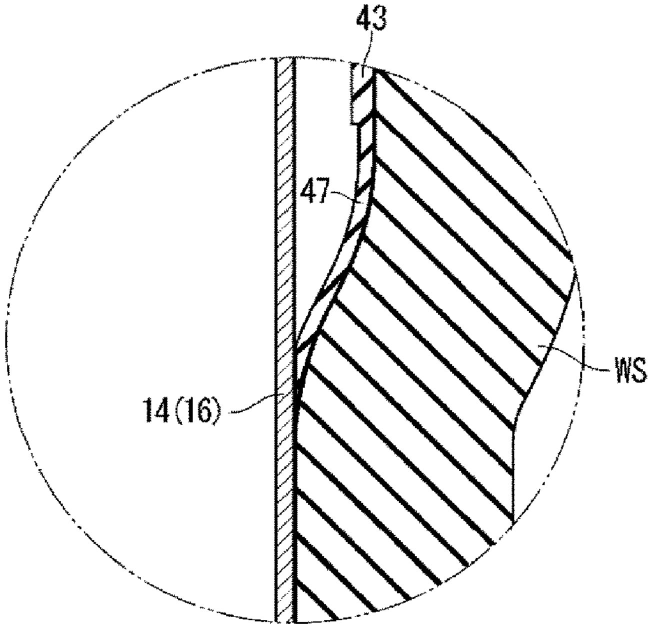
FIG. 9 is an enlarged view of an area A1 of FIG. 8.
Figure 10:
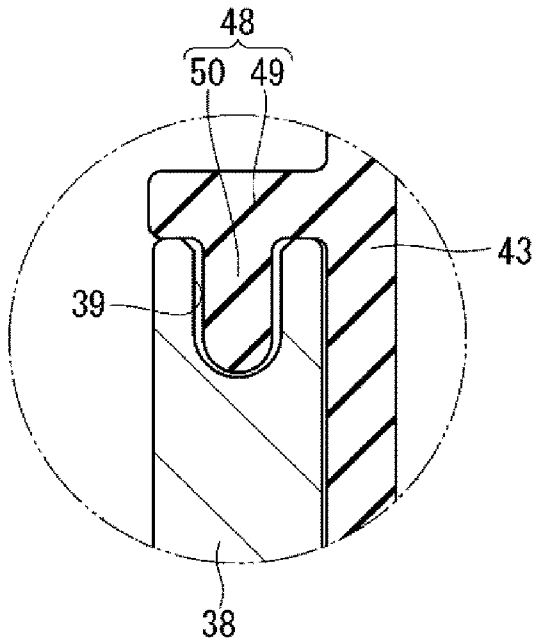
FIG. 10 is an enlarged view of an area A2 of FIG. 8.

Next, the planar member 30 and the grommet 40 will be described in detail with reference to FIGS. 6 to 10 in addition to FIGS. 1 to 5. FIGS. 6 and 7 are perspective exploded views of the planar member 30 and the grommet 40. FIGS. 6 and 7 are perspective views seen from opposite directions from each other. FIG. 8 is a cross-sectional view cut along line VIII-VIII of FIG. 4. FIG. 9 is an enlarged view of an area A1 of FIG. 8. FIG. 10 is an enlarged view of an area A2 of FIG. 8.

Planar Member

The planar member 30 extends along the inner plate portion 15 of the door panel 12. The planar member 30 closes the opening in the inner panel 14 and holds the wiring member 22 in a predetermined path. The planar member 30 may hold some or all of the devices incorporated in the door 10. The planar member 30 has the main plate portion 32 and a planar member-side attachment portion 34.

The main plate portion 32 holds the fourth section of the wiring member 22, which extends along the inner plate portion 15 of the door panel 12. The main plate portion 32 is a portion extending in a plate shape that is large enough to close the opening formed in the inner plate portion 15. For example, the peripheral edge of the main plate portion 32 is attached at multiple portions to the inner panel 14 by means of screwing or engagement structures. Here, the wiring member 22 is disposed on the surface of the main plate portion 32 that faces the inside of the vehicle. The wiring member 22 may also be disposed on the surface of the main plate portion 32 that faces the outside of the vehicle. The wiring member 22 may also be disposed on both surfaces of the main plate portion 32, that is, the surface facing the inside of the vehicle and the surface facing the outside of the vehicle. The surface of the main plate portion 32 on which the wiring member 22 is disposed will be referred to as a disposition surface 33 hereinafter. Here, the disposition surface 33 is flat. The disposition surface 73 may also be formed in a protruding and recessed shape. The portion of the disposition surface 33 covering the opening may be recessed toward the outside of the vehicle compared to the portion covering the peripheral edge of the opening, and may extend into the opening. The path of the disposition surface 33 along which the wiring member 22 is disposed may be flat. The portion along the path along which the wiring member 22 is placed may have a protruding and recessed shape. The wiring member 22 is maintained in a state of being disposed so as to extend along a predetermined path on the disposition surface 33.

The planar member-side attachment portion 34 is provided on a portion of the peripheral edge of the main plate portion 32. Here, the planar member-side attachment portion 34 is provided on the portion of the peripheral edge of the main plate portion 32 that is close to the door hinge. The planar member-side attachment portion 34 is attached to the grommet 40. Here, the planar member-side attachment portion 34 extends forward (toward the door hinge) and downward from the main plate portion 32. The planar member-side attachment portion 34 may extend in any direction from the main plate portion 32. The planar member-side attachment portion 34 has the path restricting portion 35 and an attachment body 38. The planar member-side attachment portion 34 is formed in the shape of a planar plate. The path restricting portion 35 is the portion extending from the base end portion of the planar member-side attachment portion 34 on the main plate portion 32 side to an intermediate portion in the longitudinal direction. The attachment body 38 is the portion on the leading end side of the planar member-side attachment portion 34 relative to the path restricting portion 35.

The path restricting portion 35 restricts the path of the wiring member 22. Here, a bent portion 36 is provided at the intermediate portion in the longitudinal direction of the path restricting portion 35. The part of the path restricting portion 35 from the base end portion on the main plate 32 side to the bent portion 36 extends along the inner plate portion 15. The part of the path restricting portion 35 from the bent portion 36 to the leading end portion extends along the side plate portion 16. As a result, the path restricting portion 35 restricts the wiring member 22 so that it is bent while extending between the side plate portion 16 and the inner plate portion 15. Here, an insertion portion 37 is also provided in the intermediate portion in the longitudinal direction of the path restricting portion 35.

The insertion portion 37 is a portion through which the wiring member 22 is inserted. The wiring member 22 switches from one surface of the path restricting portion 35 to the other surface through the insertion portion 37. On the base end side of the path restricting portion 35 with respect to the insertion portion 37, the wiring member 22 passes on the cabin side with respect to the path restricting portion 35. On the leading end side of the path restricting portion 35 with respect to the insertion portion 37, the wiring member 22 passes on the out-of-cabin side with respect to the path restricting portion 35. The path restricting portion 35 is located between the wiring member 22 and the door panel 12 on the base end side of the path restricting portion 35 with respect to the insertion portion 37. The wiring member 22 is located between the path restricting portion 35 and the door panel 12 on the leading end side of the path restricting portion 35 with respect to the insertion portion 37. Here, a through hole is formed in the path restricting portion 35 as the insertion portion 37. However, a through hole need not be formed as the insertion portion 37. For example, a side edge of the path restricting portion 35 may be recessed to provide an insertion portion.

The insertion portion 37 may be positioned anywhere along the longitudinal direction of the path restricting portion 35. Here, the insertion portion 37 may be provided at the bent portion 36 along the longitudinal direction of the path restricting portion 35. As a result, it is not necessary to provide both a bend when passing through the insertion portion 37 and a bend at the bent portion 36 in the wiring member 22. As shown in FIG. 5, here, the wiring member 22 extends linearly from the attachment body 38 until it exits the insertion portion 37 at the leading end portion of the path restricting portion 35, and bends along the bent portion 36 after exiting the insertion portion 37.

The intermediate portion in the widthwise direction of the path restricting portion 35 is made thin and formed in a groove shape. The wiring member 22 is disposed in the groove-shaped portion 35*a*. In the path restricting portion 35, the surface on which the wiring member 22 is disposed changes at the insertion portion 37. Therefore, in the path restricting portion 35, the surface on which the groove-shaped portion 35*a* is formed changes at the insertion portion 37. The groove-shaped portion 35*a* is formed on the surface facing the door panel 12 on the leading end side relative to the insertion portion 37, and is formed on the surface facing the cabin on the base end side relative to the insertion portion 37. The groove-shaped portion 35*a* of the path restricting portion 35 is, for example, about half as thick as the portions adjacent to the groove-shaped portion 35*a* in the widthwise direction of the path restricting portion 35. The width dimension of the groove-shaped portion 35*a* of the path restricting portion 35 is, for example, about half the width dimension of the path restricting portion 35. Although the groove portion 35*a* extends to the attachment body 38 on the leading end side with respect to the insertion portion 37, it does not reach the leading edge portion of the planar member-side attachment portion 34. Also, a gentle slope is formed along the longitudinal direction of the leading end portion of the grooved portion 35*a*.

The two side edges of the path restricting portion 35 are made thick and formed into rib shapes. The rib-shaped portions 35*b* are continuous from the base end portion of the path restricting portion 35, beyond the insertion portion 37, and toward the leading end. The rigidity of the path restricting portion 35 is increased by the rib-shaped portions 35*b*. The rib-shaped portions 35*b* suppresses the decrease in rigidity of the path restricting portion 35 due to the provision of the insertion portion 37.

The flat shape of the attachment body 38 conforms to the shape of the portion enclosed by a rib 49. Here, the flat shape of the attachment body 38 is formed in a recessed shape in which the intermediate portion of one edge of a rectangle is recessed. A through hole 44 is located at the position of the recess of the attachment body 38. The attachment body 38 is overlaid on the base plate portion 43 of the base portion 42 so as not to block the through hole 44. A recessed groove 39 is formed in the outer peripheral surface of the attachment body 38.

The recessed groove 39 is continuously formed along the outer peripheral surface of the attachment body 38. The recessed groove 39 is formed at an intermediate position in the widthwise direction of the outer peripheral surface of the attachment body 38. For example, the width dimension of the recessed groove 39 is about half as thick as the attachment body 38. For example, the depth dimension of the recessed groove 39 is approximately the same as the protrusion dimension of the ridge portion 50 from the rib 49.

Grommet

The grommet 40 includes a door attachment portion 41, the protective tube portion 52, and the vehicle body attachment portion 54.

The door attachment portion 41 is the portion attached to the door panel 12. The door attachment portion 41 is attached to the side plate portion 16. The door attachment portion 41 includes the base portion 42 and a grommet-side attachment portion 48.

The base portion 42 is formed flat. The base portion 42 is attached so as to extend over a surface of the side plate portion 16. The base portion 42 includes the base plate portion 43 and a flange 47.

The base plate portion 43 is formed in a flat plate shape. In the example shown in FIG. 3, the base plate portion 43 has a pentagonal shape, but may take some other shape. One surface of the base plate portion 43 faces the vehicle body and the other surface faces the door panel 12. The protective tube portion 52 is provided on the one surface of the base plate portion 43. The through hole 44 is formed in the portion of the base plate portion 43 in which the protective tube portion 52 is provided.

The through hole 44 is in communication with the protective tube portion 52. The wiring member 22 passes through the other surface of the base plate portion 43 from the other end to the one end, while passing through the through hole 44 to be guided into the interior of the protective tube portion 52. An annular protrusion 45 is formed on the base plate portion 43 and along the peripheral edge of the through hole 44.

The annular protrusion 45 is formed so that the peripheral edge portion of the through hole 44 of the base plate portion 43 protrudes toward the other surface. The annular protrusion 45 is formed with the same thickness as the other portions of the base plate portion 43. The portion on the one surface of the base plate portion 43 where the annular protrusion 45 is formed is recessed toward the other surface from its surrounding portion. The portion on the other surface of the base plate portion 43 where the annular protrusion 45 is formed protrudes toward the door panel 12 from its surrounding portion. The protruding dimension of the annular protrusion 45 is approximately the same as the protruding dimension of the rib 49. As a result of providing the annular protrusion 45, a case is suppressed in which the wiring member 22 strongly abuts against the rib 49 in the portion where the wiring member 22 is guided from the side plate portion 16 to the protective tube portion 52.

Attachment holes 46 are formed in the base portion 42. Bolts, clips, and the like are passed through the attachment holes 46. The base portion 42 is attached to the door panel 12 by fastening or engaging the bolts, clips, and the like, which are passed through the attachment holes 46, with the door panel 12. Here, two attachment holes 46 are formed in the base plate portion 43. The two attachment holes 46 are provided on the upper and lower sides in the vertical direction with respect to the wiring member 22. The two attachment holes 46 are formed on the same side (here, on the outer side along the inner-outer direction of the vehicle) with respect to the weather strip WS.

The flange 47 is formed on the outer edge portion of the base plate portion 43. More particularly, as shown in FIG. 4, the flange 47 is formed to protrude outward from the edges of the base plate portion 43, excluding the one edge 43*a*. That edge 43*a* is located on the cabin side of the base plate portion 43 and extends in the up-down direction. The flange 47 is formed thinner than the base plate portion 43. The flange 47 is provided on the one surface of the base plate portion 43. The flange 47 protrudes obliquely toward the door panel 12. The flange 47 protrudes from the base portion 42 further toward the door panel 12 than do the annular protrusion 45 and the rib 49. With the grommet 40 attached to the door panel 12, the flange 47 elastically deforms to conform to the door panel 12 and comes into surface contact with the door panel 12.

The flange 47 is also provided on the portion of the grommet 40 traversed by the weather strip WS. By providing the flange 47 on the portion of the grommet 40 traversed by the weather strip WS, the level difference between the door panel 12 and the grommet 40 is reduced as shown in FIG. 9. As a result, a gap is less likely to occur in the area surrounded by the weather strip WS, the door panel 12, and the grommet 40. Here, the weather strip WS traverses the one surface of the base plate portion 43 on the cabin side with respect to the portion where the through hole 44 is formed.

The grommet-side attachment portion 48 is continuous with the base portion 42. The planar member-side attachment portion 34 is attached to the grommet-side attachment portion 48. Here, the grommet-side attachment portion 48 is provided on the other surface of the base plate portion 43. The grommet-side attachment portion 48 has the rib 49 and the ridge portion 50.

The rib 49 is provided on the other surface of the base plate portion 43. The rib 49 protrudes from the base plate portion 43 toward the door panel 12. The height dimension of the rib 49 from the base plate portion 43 is approximately the same as the thickness of the attachment body 38. In the base plate portion 43, the rib 49 is provided to extend along the following path. That is, the rib 49 extends from a portion of the edge 43*a* of the base plate portion 43 in an M-shape on the base plate portion 43 and reaches another portion of the edge 43*a* of the base plate portion 43. The intermediate portion of the rib 49 is provided so as to extend along the annular protrusion 45 toward the edge 43*a* relative to the annular protrusion 45. The portion surrounded by the rib 49 does not include the through hole 44 or the annular protrusion 45. The portion surrounded by the rib 49 does not include the attachment holes 46 either.

The ridge portion 50 is provided on the inner peripheral surface of the rib 49. The ridge portion 50 is provided over the entire length of the rib 49. The ridge portion 50 protrudes from an intermediate position along the height direction of the rib 49 in parallel with the base plate portion 43. As shown in FIG. 10, the ridge portion 50 is fitted into the recessed groove 39 of the attachment body 38.

The protective tube portion 52 protrudes from the one surface of the base portion 42. The protective tube portion 52 is in communication with the through hole 44. The protective tube portion 52 is formed to be flexible. Any configuration may be used to make the protective tube portion 52 flexible. Here, the protective tube portion 52 is formed in a bellows shape to be flexible.

The vehicle body attachment portion 54 is provided at the other end of the protective tube portion 52. Here, the vehicle body attachment portion 54 is provided so as to be able to engage with a through hole formed in the vehicle body.

As shown in FIG. 5, the attachment body 38 of the planar member 30 is interposed between the portion on the grommet 40 traversed by the weather strip WS and the door panel 12. The attachment body 38 is located on the weather strip WS side relative to the wiring member 22. The attachment body 38 supports the deformation of the weather strip WS in the closed state.

Attachment of Planar Member and Grommet

Here, after being molded separately, the planar member 30 and the grommet 40 can be attached by attaching the planar member-side attachment portion 34 and the grommet-side attachment portion 48 to each other. For example, the leading end portion of the attachment body 38 of the planar member-side attachment portion 34 is inserted from the edge 43*a* side into the space defined by the rib 49 of the grommet-side attachment portion 48, thus attaching the planar member-side attachment portion 34 and the grommet-side attachment portion 48 to each other. At this time, initially, the two portions of the ridge portion 50 of the rib 49 that extend separately in the up-down direction from the edge 43*a* are fitted into the corresponding portions of the recessed groove 39 of the attachment body 38 (the portion formed in the upper surface of the upper edge and the portion formed in the lower surface of the lower edge). As the attachment body 38 continues to be inserted into the grommet-side attachment portion 48, the portion of the ridge portion 50 of the rib 49 that extends in the up-down direction while curving to circumvent the through hole 44 fits into the corresponding portion of the recessed groove 39. In this way, by fitting the entire ridge portion 50 of the rib 49 into the recessed groove 39, the planar member 30 and the grommet 40 are attached to each other. This is how the planar member-side attachment portion 34 and the grommet-side attachment portion 48 are attached to each other. With the planar member-side attachment portion 34 and the grommet-side attachment portion 48 attached to each other, when the grommet-side attachment portion 48 is elastically deformed to be slightly expanded by the planar member-side attachment portion 34, the grommet-side attachment portion 48 tightens on the planar member-side attachment portion 34 due to its restoring force, and thus the planar member-side attachment portion 34 and the grommet-side attachment portion 48 are not easily detached from each other and rattling is less likely to occur.

Advantageous Effects, Etc., of Embodiment 1

According to the wiring module 20 configured as described above, when one of the planar member 30 and the grommet 40 is positioned on the door panel 12 by attaching the planar member 30 and the grommet 40 to each other, the other can also be positioned on the door panel 12. As a result, it is possible to achieve an improvement in the attachability of the wiring module 20, in which both the grommet 40 and the planar member 30 are provided on the wiring member 22, to the door panel 12. Further, in the wiring module 20, most of the portion of the wiring member 22 that extends along the door panel 12 is held to extend along the predetermined path by the planar member 30 and the grommet 40. Therefore, when one of the planar member 30 and the grommet 40 is positioned on the door panel 12, most of the portion of the wiring member 22 that extends along the door panel 12 is positioned along the predetermined path with respect to the door panel 12.

Moreover, the grommet 40 is attached to the surface of the door panel 12, and the base portion 42 is fixed to the surface of the side plate portion 16 of the door panel 12. As a result, the grommet 40 is a through-less grommet, and therefore the wiring module 20 can be easily attached to the door panel 12.

Additionally, the main plate portion 32 and the planar member-side attachment portion 34 are attached to the surface of the door panel 12. As a result, in addition to the grommet 40, the planar member 30 is also a portion attached to the surface of the door panel 12, and therefore, when attaching the wiring module 20 to the door panel 12, the attachment can be performed without passing the wiring member 22 through the door panel 12.

Furthermore, the planar member-side attachment portion 34 extends from the inner plate portion 15 to the side plate portion 16 of the door panel 12, and the grommet-side attachment portion 48 is provided on the surface of the base portion 42 that faces the side plate portion 16. As a result, the portion of the wiring member 22 that extends between the inner plate portion 15 and the side plate portion 16 is guided by the planar member-side attachment portion 34.

Additionally, in the vehicle, the weather strip WS traverses the surface of the base portion 42, and the planar member-side attachment portion 34 extends to the portion of the base portion 42 that overlaps the weather strip WS. As a result, the planar member-side attachment portion 34 can support the portion of the base portion 42 that overlaps with the weather strip WS, thus stabilizing the compression of the weather strip WS in the closed state.

The insertion portion 37, through which the wiring member 22 is passed, is formed in the planar member-side attachment portion 34, and on the main plate portion 32 side with respect to the insertion portion 37, the planar member-side attachment portion 34 is adjacent to the wiring member 22 and is located on the door panel 12 side relative to the wiring member 22, and on the vehicle body side with respect to the insertion portion 37, the wiring member 22 is adjacent to the planar member-side attachment portion 34 and is located on the door panel 12 side relative to the planar member-side attachment portion 34. As a result, the order in which the wiring member 22 and the planar member-side attachment portion 34 are arranged with respect to the door panel 12 changes before and after passing through the insertion portion 37.

The insertion portion 37 is provided on the main plate portion 32 side relative to the portion traversed by the weather strip WS. As a result, it is possible to suppress the wiring member 22 from being sandwiched by the grommet 40 and the planar member-side attachment portion 34 at the portion traversed by the weather strip WS. This suppresses compression of the wiring member 22. In addition, the involvement of the wiring member 22 in the compression of the weather strip WS in the closed state is suppressed, and thus the compression of the weather strip WS is stabilized. The insertion portion 37 is provided at the boundary between the side plate portion 16 and the inner plate portion 15. The boundary between the side plate portion 16 and the inner plate portion 15 is the portion at which the wiring member 22 is bent. Since the insertion portion 37 is provided at the boundary between the side plate portion 16 and the inner plate portion 15, there is no need to bend the wiring member 22 excessively in order to pass it through the insertion portion 37.

Moreover, the flange 47 smoothes the level difference between the surface of the base portion 42 and the surface of the door panel 12. As a result, a gap is less likely to occur between the boundary between the door panel 12 and the grommet 40 and the weather strip WS.

Moreover, the grommet-side attachment portion 48 and the planar member-side attachment portion 34 are attached to each other by fitting the ridge portion 50 formed on the grommet-side attachment portion 48 into the recessed groove 39 formed in the planar member-side attachment portion 34. This facilitates the attachment of the grommet-side attachment portion 48 and the planar member-side attachment portion 34. Moreover, this stabilizes the attachment of the grommet-side attachment portion 48 and the planar member-side attachment portion 34.

Additionally, the electric wires 24 are arranged flat in the sections from the base portion 42 to the planar member 30 (the second to fourth sections). As a result, the height dimension of the wiring member 20 from the door panel 12 is minimized in the sections from the base portion 42 to the planar member 30.

VARIATIONS

Although both the planar member 30 and the grommet 40 have been described so far as being of a through-less type, this is not an essential configuration. It will also suffice if one or both of the planar member and the grommet are of a type that passes through the door panel 12.

Although the portion of the wiring member 22 that is bent from the side plate portion 16 toward the inner plate portion 15 has been described so far as being held by the planar member 30, this is not an essential configuration. The portion of the wiring member 22 that is bent from the side plate portion 16 toward the inner plate portion 15 may instead be held by the grommet. In this case, the grommet is preferably provided with a protective portion that protrudes from the base portion 42 toward the planar member. The protective portion may be formed in a tubular or tabular shape. The path restricting portion 35 may be omitted from the planar member so that the attachment body 38 directly protrudes from the main plate portion 32. The grommet-side attachment portion provided on the protective portion and the planar member-side attachment portion may also be attached to each other.

Also, the planar member-side attachment portion 34 has been described so far as extending to the portion of the base portion 42 that overlaps with the weather strip WS, but this is not an essential configuration. The planar member-side attachment portion 34 does not have to extend to the portion of the base portion 42 that overlaps with the weather strip WS.

Moreover, the grommet-side attachment portion 48 and the planar member-side attachment portion 34 have been described so far as being attached to each other by fitting the ridge portion 50 formed on the grommet-side attachment portion 48 into the recessed groove 39 formed in the planar member-side attachment portion 34, but this is not an essential configuration. The grommet-side attachment portion and the planar member-side attachment portion may also be attached to each other by fitting a ridge portion formed on the planar member-side attachment portion into a recessed groove formed in the grommet-side attachment portion.

It should be noted that the configurations described in the foregoing embodiments and variations can be combined as appropriate as long as they are compatible with one another.

LIST OF REFERENCE NUMERALS

10 Door
12 Door panel

13 Outer panel
14 Inner panel
15 Inner plate portion
16 Side plate portion
20 Wiring module
22 Wiring member
24 Electric wire
30 Planar member
32 Main plate portion
34 Planar member-side attachment portion
35 Path restricting portion
35*a* Groove-shaped portion
35*b* Rib-shaped portion
36 Bent portion
37 Insertion portion
38 Attachment body
39 Recessed groove
40 Grommet
41 Door attachment portion
42 Base portion
43 Base plate portion
43*a* Edge
44 Through hole
45 Annular protrusion
46 Attachment hole
47 Flange
48 Grommet-side attachment portion
49 Rib
50 Ridge portion
52 Protective tube portion
54 Vehicle body attachment portion
C1, C2 Connector
WS Weather strip

What is claimed is:

1. A wiring module, comprising:
a wiring member connecting a vehicle body and a door panel;
a planar member that holds a portion of the wiring member extending along an inner plate portion of the door panel; and
a grommet attached on the vehicle body side relative to the portion of the wiring member held by the planar member,
wherein the planar member includes a main plate portion that holds a section of the wiring member that extends along the inner plate portion of the door panel, and a planar member-side attachment portion that is provided on a portion of a peripheral edge of the main plate portion and is attached to the grommet,
the grommet includes a base portion fixed at a certain position with respect to the door panel and a grommet-side attachment portion that is continuous with the base portion and to which the planar member-side attachment portion is attached,
a weather strip traverses a surface of the base portion in a vehicle, and
the planar member-side attachment portion extends to a portion of the base portion that overlaps with the weather strip.

2. The wiring module according to claim 1, wherein the grommet is attached to a surface of the door panel, and the base portion is fixed to a surface of a side plate portion of the door panel.

3. The wiring module according to claim 2, wherein the main plate portion and the planar member-side attachment portion are attached to the surface of the door panel.

4. The wiring module according to claim 3,
wherein the planar member-side attachment portion extends from the inner plate portion to the side plate portion of the door panel, and
the grommet-side attachment portion is provided on a surface of the base portion that faces the side plate portion.

5. The wiring module according to claim 4,
wherein an insertion portion through which the wiring member is passed is formed in the planar member-side attachment portion, and
on a main plate portion side with respect to the insertion portion, the planar member-side attachment portion is adjacent to the wiring member and is located on the door panel side relative to the wiring member, and on a vehicle body side with respect to the insertion portion, the wiring member is adjacent to the planar member-side attachment portion and is located on the door panel side relative to the planar member-side attachment portion.

6. The wiring module according to claim 2,
a flange is provided on a portion of a peripheral edge of the base portion that includes a portion traversed by the weather strip, and
the flange smoothes a level difference between the surface of the base portion and the surface of the door panel.

7. The wiring module according to claim 1, wherein the grommet-side attachment portion and the planar member-side attachment portion are attached to each other by fitting a ridge portion formed on one of the grommet-side attachment portion and the planar member-side attachment portion into a recessed groove formed in the other.

8. The wiring module according to claim 7, wherein the grommet-side attachment portion and the planar member-side attachment portion are attached to each other by fitting the ridge portion formed on the grommet-side attachment portion into the recessed groove formed in the planar member-side attachment portion.

9. The wiring module according to claim 1,
wherein the wiring member includes a plurality of electric wires, and
the plurality of electric wires are arranged flat in a section from the base portion to the planar member.

10. A wiring module, comprising:
a wiring member connecting a vehicle body and a door panel;
a planar member that holds a portion of the wiring member extending along an inner plate portion of the door panel; and
a grommet attached on the vehicle body side relative to the portion of the wiring member held by the planar member,
wherein the planar member includes a main plate portion that holds a section of the wiring member that extends along the inner plate portion of the door panel, and a planar member-side attachment portion that is provided on a portion of a peripheral edge of the main plate portion and is attached to the grommet,
the grommet includes a base portion fixed at a certain position with respect to the door panel and a grommet-side attachment portion that is continuous with the base portion and to which the planar member-side attachment portion is attached,
an insertion portion through which the wiring member is passed is formed in the planar member-side attachment portion, and
on a main plate portion side with respect to the insertion portion, the planar member-side attachment portion is adjacent to the wiring member and is located on the door panel side relative to the wiring member, and on a vehicle body side with respect to the insertion portion, the wiring member is adjacent to the planar member-side attachment portion and is located on the door panel side relative to the planar member-side attachment portion.

11. The wiring module according to claim 10, wherein on the main plate portion side with respect to the insertion portion, the planar member-side attachment portion is disposed between the door panel and the wiring member, and on the vehicle body side with respect to the insertion portion, the wiring member is disposed between the door panel and the planar member-side attachment portion.

12. A wiring module, comprising:

a wiring member connecting a vehicle body and a door panel;

a planar member that holds a portion of the wiring member extending along an inner plate portion of the door panel; and a grommet attached on the vehicle body side relative to the portion of the wiring member held by the planar member, wherein the planar member includes a main plate portion that holds a section of the wiring member that extends along the inner plate portion of the door panel, and a planar member-side attachment portion that is provided on a portion of a peripheral edge of the main plate portion and is attached to the grommet, the grommet includes a base portion fixed at a certain position with respect to the door panel and a grommet-side attachment portion that is continuous with the base portion and to which the planar member-side attachment portion is attached, and the grommet-side attachment portion and the planar member-side attachment portion are attached to each other by fitting a ridge portion formed on one of the grommet-side attachment portion and the planar member-side attachment portion into a recessed groove formed in the other.

* * * * *